United States Patent [19]
Ose

[11] Patent Number: 5,156,043
[45] Date of Patent: Oct. 20, 1992

[54] HYDRAULIC CHUCK

[75] Inventor: Paul N. Ose, St. Anthony, Minn.

[73] Assignee: Air-Mo Hydraulics Inc., Minneapolis, Minn.

[21] Appl. No.: 503,261

[22] Filed: Apr. 2, 1990

[51] Int. Cl.⁵ .................. G01M 3/02; B23B 31/02
[52] U.S. Cl. .................. 73/49.8; 73/46; 279/4.08
[58] Field of Search .......... 73/49.8, 46, 49.1, 40; 279/4

[56] References Cited

U.S. PATENT DOCUMENTS

| | | | |
|---|---|---|---|
| 2,743,604 | 5/1956 | Stein et al. | 279/4 X |
| 2,982,557 | 5/1961 | Anschutz | 279/4 |
| 3,388,588 | 6/1968 | Vincenot | 73/49.8 X |
| 3,505,846 | 4/1976 | Smida | 72/61 |
| 3,643,500 | 2/1972 | Anderson | 73/803 |
| 3,813,751 | 6/1974 | Smida | 29/727 |
| 3,871,209 | 3/1975 | Hasha | 73/46 X |
| 3,962,769 | 6/1976 | Smida | 29/727 |
| 4,090,395 | 5/1978 | Dixon et al. | 73/46 X |
| 4,189,162 | 2/1980 | Rasmussen et al. | 279/4 |
| 4,870,242 | 9/1989 | Sckzda | 279/4 X |

FOREIGN PATENT DOCUMENTS

| | | | |
|---|---|---|---|
| 1049124 | 1/1959 | Fed. Rep. of Germany | 73/46 |
| 2741166 | 3/1979 | Fed. Rep. of Germany | 279/4 |
| 847112 | 7/1981 | U.S.S.R. | 73/46 |
| 1146563 | 3/1985 | U.S.S.R. | 73/49.8 |
| 1188937 | 4/1970 | United Kingdom | 279/4 |

*Primary Examiner*—Tom Noland
*Attorney, Agent, or Firm*—John S. Munday

[57] ABSTRACT

A hydraulic chuck device for testing the integrity of a ferrule sealed to a tube proximate one end of the tube. The device includes a chuck body having an inlet end with an internal collet engaging surface and a second end. Collets are mounted inside the inlet end of the body. The collet has faces shaped to conform to a ferrule on a tube, and normally urges the collets against the engaging surface of the body. An actuator is connected to a source of fluid, and is mounted in the body. The actuator includes a ferrule seal which is normally in a ferrule engaging position for introducing the fluid to the tube. A handle is provided for inserting a ferrule and tube into the device to allow the collets to engage the ferrule on one side of its seal to the tube and the ferrule seal to engage the ferrule on the other side of its seal to the tube when fluid is introduced into the tube.

14 Claims, 1 Drawing Sheet

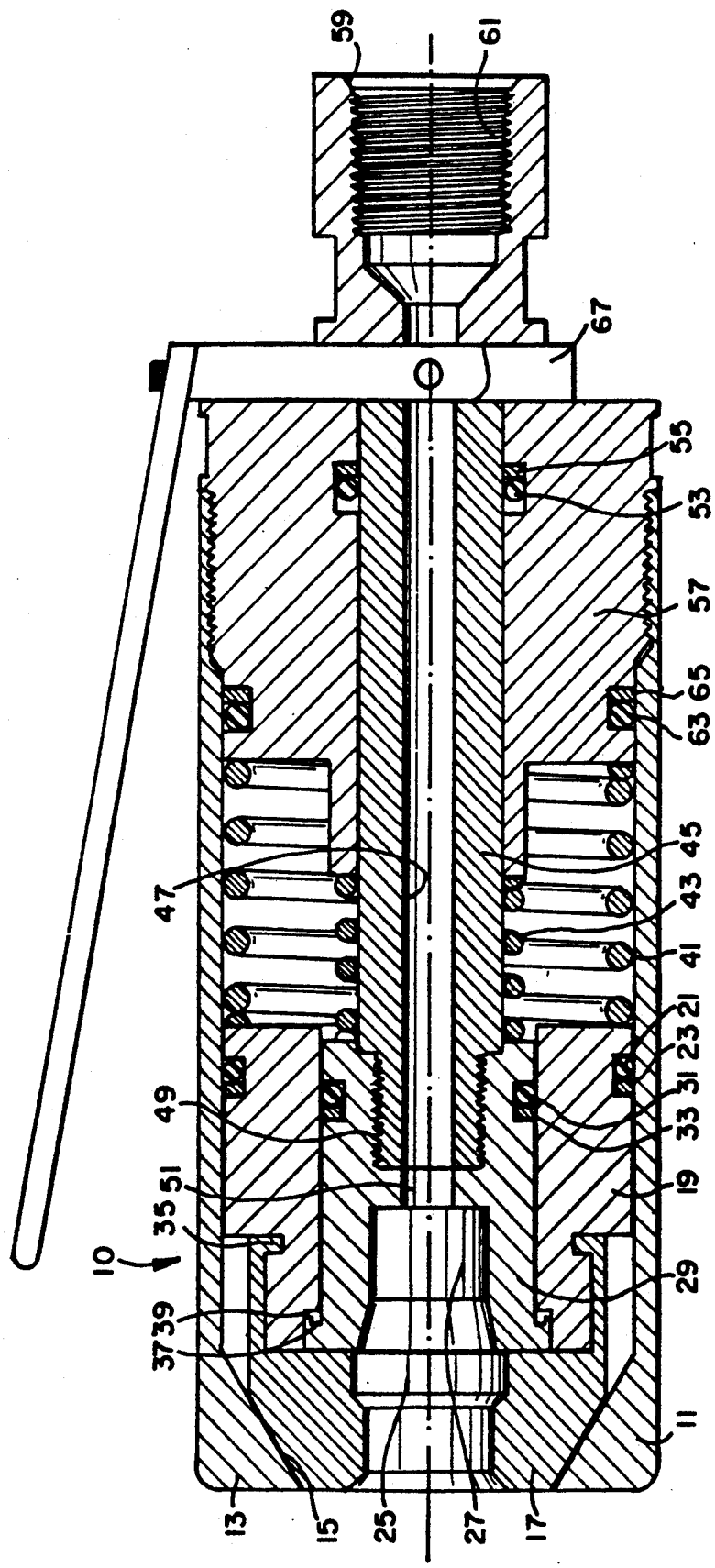

HYDRAULIC CHUCK

FIELD OF THE INVENTION

This invention relates to a device for testing a ferrule, and more particularly to a hydraulic chuck device for testing the integrity of the joint or junction between the ferrule and the tube without disturbing the seal surface.

BACKGROUND OF THE INVENTION

Fluid pressure devices operated by hydraulic pressure or pneumatic pressure are known, particularly for expanding tubes such as those used in air conditioning coils and the like. Several hydraulic devices have been developed which are suitable for tightly gripping one end of an elongated tube while simultaneously delivering a tube expanding fluid. Among these are U.S. Pat. Nos. 3,505,846; 3,813,751; 3,962,769; and 4,189,162.

None of these patents describe devices which are suitable for use with other hydraulic fittings such as ferrules. When tubes are to be connected with this type of fitting, a ferrule is crimped on to the outside of a tube. A nut is placed behind the ferrule and a mating fitting is fastened to it. In this manner, two tubes can be joined.

One of the problems which is encountered in the assembly of ferrule junctions is the need to test the seal of the tube and ferrule junction before the unit is assembled without harming the integrity of the junction. Currently, no simple and efficient device exists to permit this testing without actually destroying or at the least weakening the junction.

The only prior art devices which are used currently available to test the junction of ferrules to tubes are incapable of making such a test without causing serious damage to the ferrule junction because those devices operate directly on the junction or joint between the ferrule and the tube. This junction may only be about 0.002 inches in length, and cannot be disturbed without being destroyed.

Accordingly, it would be of great advantage in the art if a device could be provided for testing the junction of a ferrule and tube without destroying the integrity of that junction. It is an object of this invention to provide a device for obtaining this advantage.

Another advantage in the art would be obtained if the testing of ferrule tube junctions could simulate the same torque or force to which the junction will be subjected. This is also an object of this invention.

Other objects will appear hereinafter.

SUMMARY OF THE INVENTION

It has now been discovered that the above and other objects of the present invention may be accomplished in the following. Specifically, a hydraulic chuck has been discovered which comprise a plurality of parts in interworking relationship which accomplish the above and other described objects.

The hydraulic chuck of this invention comprises a chuck device for testing the integrity of ferrules sealed to a tube proximate one end of the tube. The device includes a chuck body having an inlet end and a second end at which the fitting is located for connection to a source of fluid under pressure. The inlet end includes an internal collet engaging surface which cooperatively acts with collets inside said body to grip or engage the ferrule on the rear side of its seal to the tube. A biasing means such as a coil spring is positioned inside said body to urge the collets against the engaging surface to thereby close the collets in the normal or closed position of the device.

Also included is an actuator means which is connected to the source of fluid, so that fluid can be introduced into the tube. The actuator means is preferrably slideably mounted in the body and is adjacent the collet activating means. A ferrule seal means is included in the actuator means and is in communication this the fluid source through a central bore. The ferrule seal may be removeably mounted on the actuator means via a threaded connection. Also included is a second biasing means, preferably in the form of a coil spring, which urges the ferrule seal means into a ferrule engaging position on the front side of the ferrule when the device is in said closed or normal position.

In addition, a handle means may be mounted between the second end of the body, such as by having a threaded cap and one end of the actuator means mounting the handle. In this manner, the handle can operate with a cam action to move the collets and the ferrule seal means from the normal or closed position to an open position. The ferrule on the tube can then be inserted when the device is in an open position.

BRIEF DESCRIPTION OF THE DRAWINGS

For a more complete understanding of the invention, reference is hereby made to the drawings, in which:

The FIGURE is a sectional view of a side elevation of a hydraulic chuck device of the present invention, with the section taken along the center axis of the chuck device.

DETAILED DESCRIPTION OF THE INVENTION

As shown in the FIGURE, the device is shown generally by reference numeral 10. The hydraulic chuck body 11 has a first end 13 which has an internal collet engaging face 15.

Collets 17 are aligned to engage face 15 when collet activating means 19 is urged axially against the collets 17. Collet activating means 19 is slideably mounted inside body 11 and includes an O-ring seal 21 and back-up ring 23 to prevent more than a lubricating amount of fluid to pass between the activating means 19 and the body 11. Collets 17 have collet faces which are shaped to conform to and engage ferrule 25 and tube 27 at the rear end of ferrule 25.

Ferrule seal means 29 encompasses the other end of ferrule 25 and tube 27, to complete the enclosure of the ferrule assembly being tested. Seal 29 is slideably mounted inside activator 19 and also has an O-ring 31 and back-up ring 33 to control fluid loss and lubrication.

Collets 17 are attached to activator 19 by ring 35 on the collets 17 which fits into a matching groove on the activator 19. Similarly, ring 37 attaches seal 29 to activator 19, but includes gap 39 in the groove for ring 37 because there will be some small movement between the seal 29 and activator 19.

First biasing means are provided in the form of coil spring 41, which is supported in body 11 and which urges the activator 19 and therefore collets 17 against collet engaging surface 15 so that collets 17 are in a normally closed position, engaging ferrule 25 and tube 27 if they are present in the device. Also, second biasing means are provided in the form of coil spring 43, which is supported on axially centered actuator 45. Spring 43 urges ferrule seal 29 in a normally closed condition so that it also engages ferrule 25 and tube 27 if they are present in the device.

Actuator 45 includes an axially centered bore 47 which is connected to a supply of fluid and permits introduction of fluid into the tube and ferrule being tested. Actuator 45 is attached to seal 29 by threads 49 ad passage 51 allows fluid flow into tube 25.

At the other end of actuator 45, 0-ring 53 and backup ring 55 allow actuator 45 to slide in end cap 57, which is threaded to the body 11 at the second end thereof. Actuator 45 has an attachment end 59 for attaching to a source of fluid under pressure (not shown) during operation of the device. Threads 61 permit a leakproof, safe attachment of end 59 to the source of fluid. O-ring 63 and back-up ring 65 also provide sealing between the body 11 and the end cap 57.

Handle 67 is positioned between end cap 57 and attachment end 59 and functions on a cam operated basis to move the collets 17 and the ferrule seal 29 from the normal, closed position to an open position where a ferrule and tube can be inserted into the inlet end 13 of body 11.

In operation, cam handle 67 is moved from the pictured horizontal position, which has been designated as the normal, closed position, to the open or vertical position. This action retracts the ferrule seal 29 and the collet activators 19. In this position, ferrule 25 and tube 27 to be tested can be inserted into the chuck. Cam handle 67 is then moved back to the normal, closed position.

Collet activator spring 41 moves the collet activator 19 forward, causing collets 17 to fully close without radial pressure on the rear of ferrule 25. In similar manner, ferrule seal 29 moves to and seals against the front of ferrule 25 due to the action of second biasing means spring 43. Ferrule 25 and tube 27 are now ready for testing.

While the invention has been shown with regard to one preferred embodiment, it is intended that modifications and changes can be made as long as they are encompassed by the following claims.

Having thus described the invention, what is claimed is:

1. A hydraulic chuck device for testing the integrity of a ferrule sealed to a tube proximate one end of said tube, comprising:
   a chuck body having an inlet end with an internal collet engaging surface and a second end;
   collet means including collets and mounted inside said inlet end of said body, said collet means having faces shaped to conform to the ferrule, said collet means further including collet activating means for normally urging said collets against said engaging surface;
   actuator means connected to a source of fluid, said actuator means being mounted in said body and including ferrule seal means normally in a ferrule engaging position for introducing said fluid to said tube; and
   means for inserting the ferrule and tube into said device to allow said collet means to engage said ferrule on one side of its seal to said tube and said ferrule seal means to engage said ferrule on the other side of its seal to said tube when fluid is introduced into said tube.

2. The device of claim 1, wherein said collet means includes first biasing means for urging said collets against said engaging surface when said device is in a closed condition.

3. The device of claim 1, wherein said actuator means includes second biasing means for urging said ferrule seal means to said ferrule engaging position when said device is in a closed condition.

4. The device of claim 3, wherein said actuator means is slideably mounted in said body adjacent said activating means.

5. The device of claim 1, wherein said means for inserting the ferrule includes handle means for moving said device to an open position to thereby release said collet means and move said ferrule seal means from said ferrule engaging position, and for return to said closed position upon release of said handle means.

6. The device of claim 5, wherein said handle means is mounted between an end cap mounted on said second end of said body and a portion of said actuator means.

7. A hydraulic chuck device for testing the integrity of a ferrule sealed to a tube proximate one end of said tube, comprising:
   a chuck body having an inlet end with an internal collet engaging surface and a second end;
   collet means including collets and mounted inside said inlet end of said body, said collet means having faces shaped to conform to the ferrule, said collet means further including collet activating means and first biasing means for urging said collets against said engaging surface normally when said device is in a closed condition;
   actuator means connected to a source of fluid, said actuator means being slideably mounted in said body and adjacent said activating means, said actuator means including ferrule seal means mounted thereon and second biasing means for urging said seal means to a ferrule engaging position for introducing said fluid to said tube when said device is in said closed condition; and
   handle means for moving said device to an open position by overcoming said first and second biasing means to thereby release said collet means and move said ferrule seal means from said ferrule engaging position, whereby the ferrule sealed proximate an end of a tube can be inserted into said inlet end and return of said device to said closed position allows said collet means to engage said ferrule on one side of its seal to said tube and said ferrule seal means to engage said ferrule on the other side of its seal to said tube.

8. The device of claim 7, wherein said body includes a second end having a threaded end cap thereon.

9. The device of claim 7, wherein said collet means has faces shaped to conform to a rear side of said ferrule on its seal to said tube and the collet faces close on said rear side of said ferrule without radial pressure thereon.

10. The device of claim 7, wherein said actuator means includes a central bore connected to said source of fluid, and said ferrule seal means is in communication with said central bore, and said second biasing means urges said seal means to the ferrule engaging position on a front side of said ferrule when said device is in said closed condition.

11. The device of claim 7, wherein said handle means is mounted between an end cap on said second end of said body and a portion of said actuator means for moving said device to said open position by cam action to overcome said first and second biasing means.

12. A hydraulic chuck device for testing the integrity of a ferrule sealed to a tube proximate one end thereof, comprising:

a chuck body having an inlet end with an internal collet engaging surface and a second end having a threaded end cap thereon;

collet means including collets and mounted inside said inlet end of said body, said collet means having faces shaped to conform to a rear side of said ferrule on its seal to said tube, said collet means further including collet activating means slideably mounted in said body and having first biasing means for urging said collets against said engaging surface normally when said device is in a closed condition to cause said collet faces to close on said rear side of said ferrule without radial pressure thereon;

actuator means connected to a source of fluid and having a central bore for providing fluid under pressure to the inside of said tube, said actuator means being slideably mounted in said body and adjacent said activating means, said actuator means including ferrule seal means in communication with said central bore and removedly mounted thereon by a threaded connection, said actuator means also including second biasing means for urging said seal means to a ferrule engaging position on a front side of said ferrule when said device is in said closed condition; and handle means mounted between said end cap and a portion of said actuator means for moving said device to an open position by cam action to overcome said first and second biasing means to thereby release said collet means and move said ferrule seal means from said ferrule engaging position, whereby the ferrule sealed proximate an end of a tube can be inserted into said inlet end and return of said device to said closed position allows said collet means to engage said ferrule on the rear side of its seal to said tube and said ferrule seal means to engage said ferrule on the front side of its seal to said tube.

13. The device of claim 12, which further includes seal means between said ferrule seal means and said collet means.

14. The device of claim 12, which further includes seal means between said collet activating means and said body.

* * * * *